(12) United States Patent
Scholl et al.

(10) Patent No.: US 12,124,918 B2
(45) Date of Patent: Oct. 22, 2024

(54) FULL SPECTRUM COLOR HOLOGRAPHIC QUICK RESPONSE CODE

(71) Applicant: HNU Photonics LLC, Kahului, HI (US)

(72) Inventors: James F. Scholl, Tucson, AZ (US); Daniel O'Connell, Kihei, HI (US); Riley Aumiller, Wailuku, HI (US); Monica Kelsey, Kihei, HI (US); William Goodman, Albuquerque, NM (US)

(73) Assignee: HNU PHOTONICS, LLC, Kahului, HI (US)

( * ) Notice: Subject to any disclaimer, the term of this patent is extended or adjusted under 35 U.S.C. 154(b) by 0 days.

(21) Appl. No.: 16/702,925

(22) Filed: Dec. 4, 2019

(65) Prior Publication Data

US 2020/0184169 A1 Jun. 11, 2020

Related U.S. Application Data

(60) Provisional application No. 62/775,101, filed on Dec. 4, 2018.

(51) Int. Cl.
*G06K 9/80* (2006.01)
*G06K 7/14* (2006.01)
(Continued)

(52) U.S. Cl.
CPC ..... *G06K 7/1417* (2013.01); *G06K 19/06037* (2013.01); *G06K 19/06065* (2013.01); *G06K 19/0614* (2013.01); *H04L 9/0637* (2013.01)

(58) Field of Classification Search
CPC ...... G06K 7/10; G06K 7/1014; G06K 7/1417; G06K 7/1426
(Continued)

(56) References Cited

U.S. PATENT DOCUMENTS 8,678,289 B2 * 3/2014 Roseman .............. G06K 19/16
235/488
9,053,364 B2 * 6/2015 Mercolino .............. G06K 7/10
(Continued)

OTHER PUBLICATIONS

Divya P S et al., security with holographic barcode, 2013 internation conference on control communication and computing, IEEE, Dec. 13, 2013, pp. 162-166 (Year: 2013).*
(Continued)

*Primary Examiner* — Daniel St Cyr
(74) *Attorney, Agent, or Firm* — Cermak & McGowan LLP; James Creighton Wray; Malcolm K. McGowan

(57) ABSTRACT

Information is recorded in quick response codes. A hologram is made from quick response codes and provides three dimensions of information in a two-dimensional hologram. The holograms are used for recording large amounts of information in two dimensions. Multiple quick response codes containing copious information are created using different light wave frequencies in different quick response encoders. The multiple quick response codes are combined in a two-dimensional hologram that is used on labeling. The hologram is read by a hologram reader. Each quick response frequency layer is separated from the hologram. The quick response code is extracted from each layer. A quick response reader provides the information that has been recorded.

11 Claims, 7 Drawing Sheets

A 48X48 3-LAYER QR CODE SUPERIMPOSING THREE LAYERS OF INFORMATION.

(51) Int. Cl.
*G06K 19/06* (2006.01)
*H04L 9/06* (2006.01)

(58) Field of Classification Search
USPC ............ 235/462.09, 462.1, 462.34, 454, 469
See application file for complete search history.

(56) References Cited

U.S. PATENT DOCUMENTS

| | | | |
|---|---|---|---|
| 10,002,277 B1 * | 6/2018 | Endress | H04L 9/3278 |
| 2012/0243797 A1 * | 9/2012 | Di Venuto Dayer | G06K 9/3208 |
| | | | 382/218 |
| 2012/0280043 A1 * | 11/2012 | Roseman | G06K 19/14 |
| | | | 235/488 |
| 2012/0319815 A1 * | 12/2012 | Feldman | G01S 5/04 |
| | | | 340/5.8 |
| 2016/0078333 A1 * | 3/2016 | Simske | G06K 19/06056 |
| | | | 235/462.04 |
| 2018/0018845 A1 * | 1/2018 | Gary | G06K 19/0614 |
| 2018/0311704 A1 * | 11/2018 | Gil | B07C 3/08 |
| 2019/0311165 A1 * | 10/2019 | Seitz | G06K 7/10722 |

OTHER PUBLICATIONS

DivYa Prakash S, Sneha Sara Thomas, Sheeja M. K.: Implementation of digital hologram using different wavelenghts and color quick response codes for high profile security application, International Journal of Applied Engineering Research, vol. 10, No. 2, 2015, pp. 3311-3320, XP009518976 (Year: 2015).*

* cited by examiner

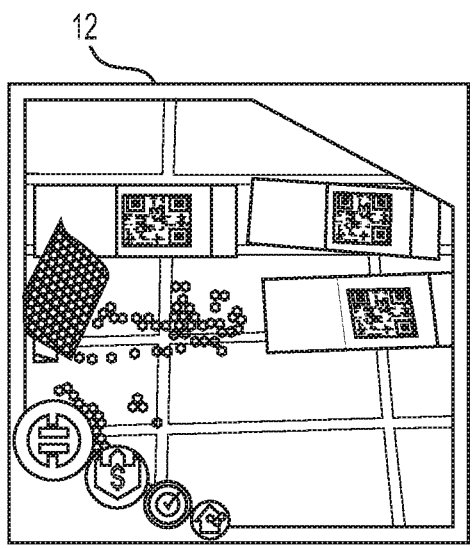
CUSTOM MANUFACTURE
HOLOGRAM QR CODE
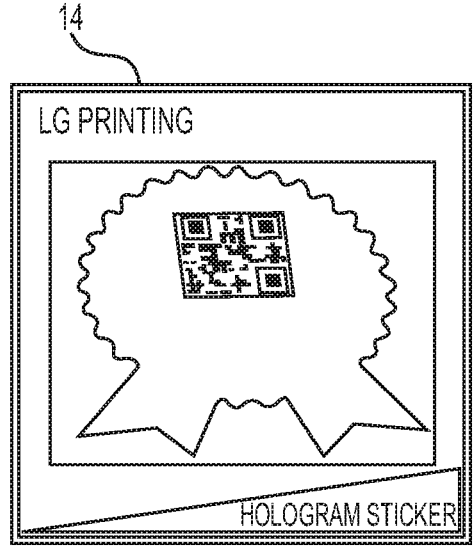
CUSTOM MADE
HOLOGRAM QR CODE
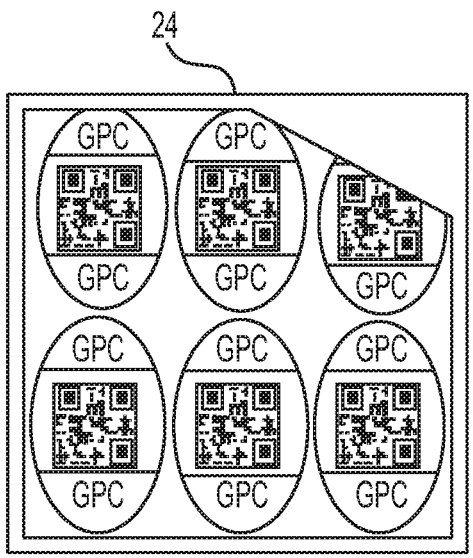
CUSTOM QR CODE 3D SECURITY
HOLOGRAM STICKERS WITH HIGH
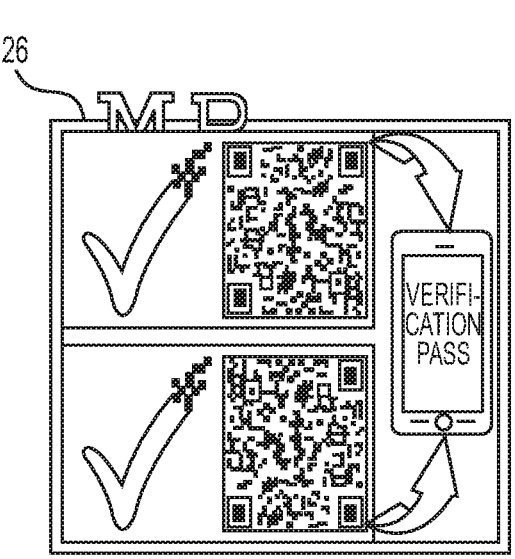
HOLOGRAM QR CODE, HOLOGRAM
LABELS
EXAMPLES OF QR CODES WITH HOLOGRAMS WHICH IS DIFFERENT THAN COLOR
HOLOGRAPHIC QR CODES
*FIG. 1*

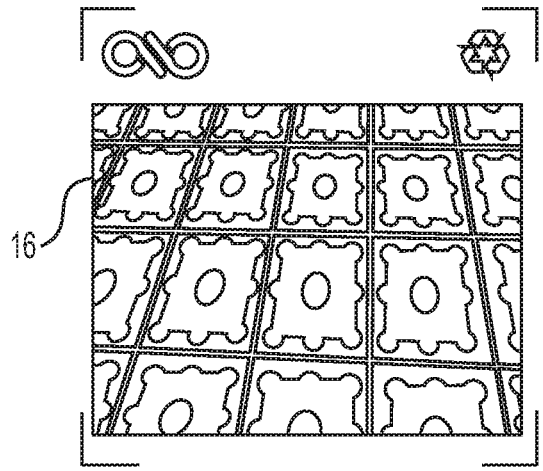
CUSTOM QR CODE
3D SECURITY HOLOGRAM
STICKERS WITH HIGH
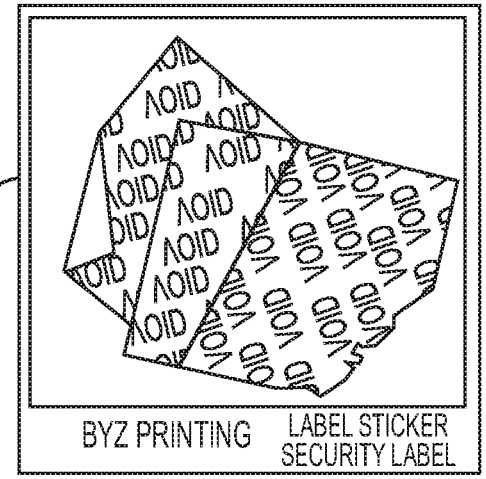
CUSTOM HOLOGRAM QR
CODE TAMPER EVIDENT
STICKER
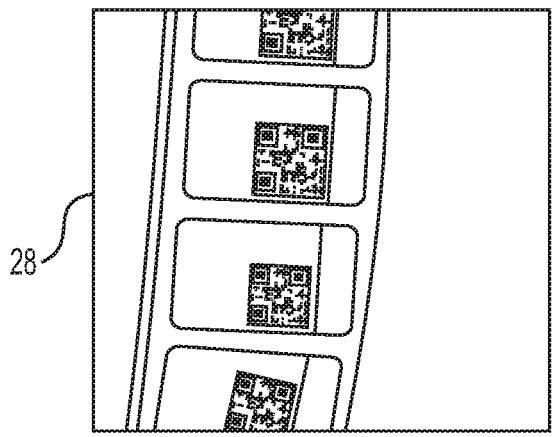
QR CODE TAMPER EVIDENT
HOLOGRAM STICKER WITH
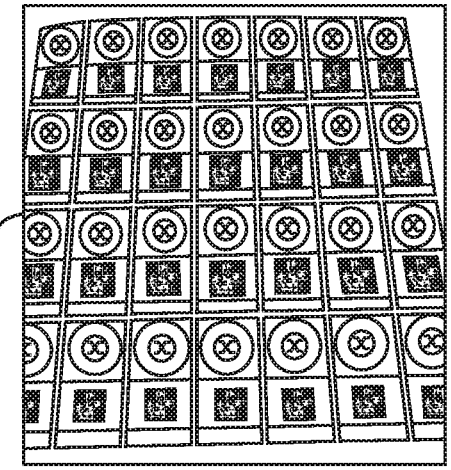
HOT SALE GOLD CUSTOM QR CODE
3D SECURITY HOLOGRAM STICKER
*FIG. 1*
*(CONT.)*

(CONT. 2)

A 48X48 3-LAYER QR CODE SUPERIMPOSING THREE LAYERS OF INFORMATION.

AN IMAGE OF THE 3-LAYER QR CODE OBTAINED WITH AN IMAGING SYSTEM USING A DISPERSIVE HOLOGRAM; ALL THREE LAYERS ARE SEPARATED CLEANLY

RECOVERED R, G, AND B LAYERS FROM THE QR CODE IN FIGURE 2b

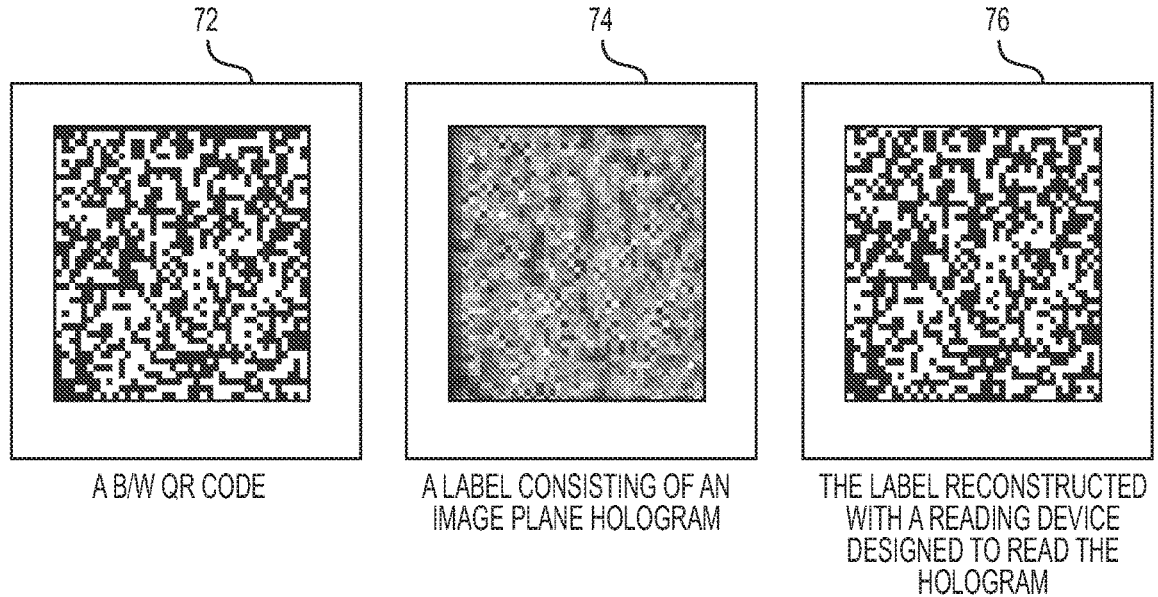

FIG. 4A — A B/W QR CODE

FIG. 4B — A LABEL CONSISTING OF AN IMAGE PLANE HOLOGRAM

FIG. 4C — THE LABEL RECONSTRUCTED WITH A READING DEVICE DESIGNED TO READ THE HOLOGRAM

ALPHANUMERIC CHARACTER CODES

| CODE | CHARACTER | CODE | CHARACTER | CODE | CHARACTER | CODE | CHARACTER | CODE | CHARACTER |
|---|---|---|---|---|---|---|---|---|---|
| 00 | 0 | 09 | 9 | 18 | I | 27 | R | 36 | SP |
| 01 | 1 | 10 | A | 19 | J | 28 | S | 37 | S |
| 02 | 2 | 11 | B | 20 | K | 29 | T | 38 | % |
| 03 | 3 | 12 | C | 21 | L | 30 | U | 39 | * |
| 04 | 4 | 13 | D | 22 | M | 31 | V | 40 | + |
| 05 | 5 | 14 | E | 23 | N | 32 | W | 41 | - |
| 06 | 6 | 15 | F | 24 | O | 33 | X | 42 | . |
| 07 | 7 | 16 | G | 25 | P | 34 | Y | 43 | / |
| 08 | 8 | 17 | H | 26 | Q | 35 | Z | 44 | : |

A TYPICAL, READILY TAILORABLE TO REQUIREMENTS, ALPHANUMERIC CODEBOOK

FIG. 5

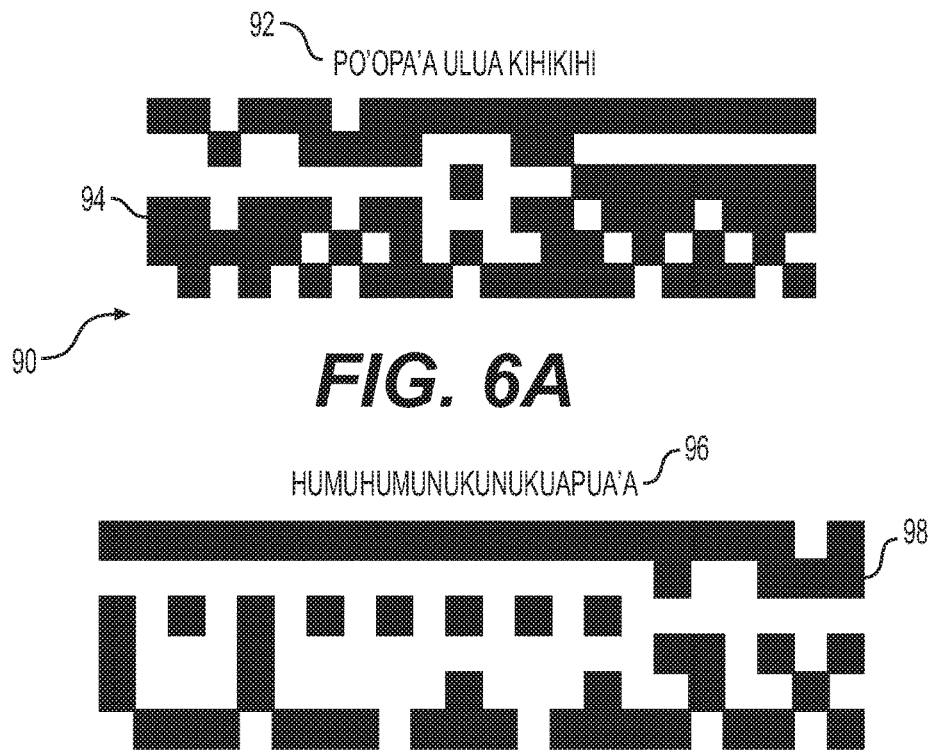
FIG. 6A
FIG. 6B
TWO EXAMPLES OF BIT-CODING OF WORDS FROM THE TABLE IN FIGURE 6. THE BITS CAN BE ARRANGED TO FORM INFORMATION STORED IN SINGLE LAYER B/W OR COLORED QR CODES
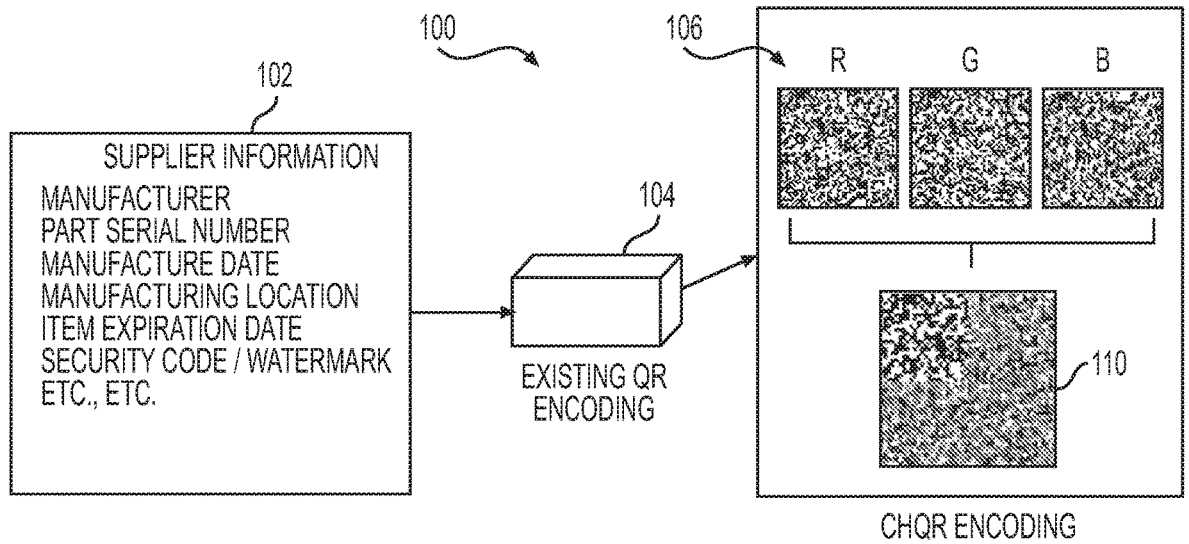
CHQR IS ABLE TO ENCODE AN ENORMOUS AMOUNT OF INFORMATION AND FEATURES
FIG. 7

FULL SPECTRUM COLOR HOLOGRAPHIC QUICK RESPONSE CODE

This application claims the benefit of U.S. Provisional Application No. 62/775,101 filed Dec. 4, 2019, which is hereby incorporated by reference in its entirety as if fully set forth herein.

BACKGROUND OF THE INVENTION

Counterfeiting of microelectronics is of great concern to industry and government because a system malfunction can present situations that cause mission failures, health and safety concerns and jeopardize national security. They also have a negative impact on brand reputation, and R/D efforts. Furthermore, counterfeits pose a reduction in reliability and channel substantial resources to criminal networks, organized crime and the illicit marketplace.

An effective counterfeit part prevention and avoidance plan should have several levels of processes. The example risk-based approach below is one that Honeywell employs for electronics:

Maximize availability of authentic parts by procuring from reliable sources.

When it is not possible to buy from original component manufacturers (OCM) and franchised distributors, develop risk assessment plans for material procured from non-franchised distributors.

Ensure adequate testing from approved test houses on material procured from non-franchised distributors to determine suspect part status based on criticality of device, application, and supplier.

Improve receiving and inspection requirements of non-franchised procured parts to prevent counterfeit parts from entering the supply chain.

Referencing Visiongain, the global anti-counterfeit packaging market will generate revenues of $18.14 billion. Referencing the Future of Anti-Counterfeiting, Brand Protection and Security Packaging to 2020, a new market report from Smithers Pira, the forecast for the global market for anti-counterfeiting, brand protection and security packaging technology will grow during the period 2015-20 at a compound annual growth rate (CAGR) of 9.3% to $4.2 billion. MarketsandMarkets projects that the anti-counterfeit packaging market size will grow from $82.05 billion to $153.95 billion by 2020, at an estimated CAGR (cumulative annual growth rate) of 13.41%. Regardless of the forecasting agency, it is very clear that the anti-counterfeit packaging marketplace is huge. Just for the DLA alone, the presently established Federal Supply Code (FSC), consists of 78 groups, which are subdivided into 645 classes, and more than 6.4 million items to be tracked. When we consider pharmaceuticals, consumer electronics, currency, food, tobacco, and hundreds of other categories, the need for the present invention is readily obvious.

Needs exist for new package labeling which is impossible or extremely difficult to copy and counterfeit.

SUMMARY OF THE INVENTION

This invention provides tamper resistant, full spectrum, multi-layer quick response (QR) code, holographic imagery, anti-counterfeit, holograms for package labeling.

The new full Spectrum Color Holographic Quick Response (FSCHQR) technology combines multiple RGB 3-layer quick response (QR) codes with holographic imaging software and hardware technology that creates features that would be extremely difficult for counterfeiters to replicate. FSCHQR is not QR codes with holograms in parallel; instead, FSCHQR makes a multidimensional QR code the hologram itself. We use the mathematics of holography to encrypt a code that cannot be copied.

FSCHQR is a major enhancement of existing multicolor QR codes in that holography is explicitly incorporated into the design. To reiterate part (a), FSCHQR is not QR code with holograms in parallel; it is a hologram with anti-tamper and anti-counterfeiting capabilities incorporated in its design.

FSCHQR incorporates QR codes consisting of matrices of information coded as two-dimensional patterns arranged in three, four, ten, twelve, twenty-four or any number of narrowband color layers either arranged in primary colors RGB, or in the Ultraviolet (UV) or extending into the Infrared (IR). The encoded layers of QR codes is converted into a hologram. This hologram enables features that are difficult to replicate by counterfeiters, such as the use of codebooks to encrypt the code in each layer. These codebooks can be adapted for different applications or products; it is possible to develop these codebooks to also enable anti-tampering capabilities.

Additional embodiments of the FSCHQR innovation are described in the following embodiments.

FSCHQR: Instead of being limited to 3 color planes (B, G, R) in FSCHQR we can take advantage of the 8-bit data storage architecture used for example in (standard) JPEG image data files. Color images in JPEG are 8 bit in each of the B, G, and R producing a total of 24 bits. A generalization of FSCHQR can be applied to encoding information in each of those bit-planes such that we can store 24 layers of information. The FSCHQR code becomes a continuous color coded data image with additional capability of storing an 8-layer B/W image within each band. For 16-bit images we can store vast amount of data within a single FSCHQR color coded label.

The term Hologram refers to diffractive devices such as rainbow holograms, 2D or 3D holograms, dot-matrix holograms, holographic stereograms, diffraction gratings, Excelgrams, Pixelgrams, and Kinegrams. For more than several years now various companies have been combining QR codes or bar codes with holograms, but these are in parallel, rather than layered like FSCHQR. A recent screenshot for Hologram QR codes on the Alibaba website shows examples of the parallel approach, FIG. 1. Customized "stickers" can be purchased from China at the cost of $0.01 or more in bulk, certainly an affordable approach.

A new package label has at least one hologram incorporating multi-dimensional quick response code. The multi-dimensional quick response code within the hologram further incorporates multiple layers of quick response codes.

In one embodiment the multiple layers of quick response codes are three-layer quick response codes, and the three layers of quick response codes are distinct color quick response codes.

The distinct color quick response codes are red, green, blue quick response codes.

In another embodiment the color quick response codes are full spectrum color quick response codes.

The multiple layers of quick response codes further comprise matrices of quick response information coded as two-dimensional patterns in three or more color layers, each layer having a distinct color. The three or more color layers are narrow band color layers. The narrow band color layers include layers ranging from ultraviolet to infrared.

Multiple layers of quick response information coded layers are converted into a hologram.

The invention provides a label difficult to counterfeit. Multiple quick response (QR) codes are provided.

A multi-dimensional quick response code from the multiple quick response codes is made by creating a coded hologram from the multi-dimensional quick response codes, and applying the coded hologram to a package label. The multiple quick response codes are provided in multiple layer quick response codes. The providing of multiple layer quick response codes includes providing multiple layer color quick response codes.

The multiple layer quick response codes include multiple layers of red, green and blue quick response codes.

The providing of multiple layer color quick response codes also includes full spectrum color quick response codes.

The new system includes coding labels with quick response codes by providing multiple quick response codes, each of the multiple quick response codes being in a distinct frequency.

Encoding numerous bits of information in each of the multiple quick response codes, and combining the three dimensions the multiple quick response codes provides a two-dimensional hologram. The distinct frequencies are distinct light frequencies between infrared and ultraviolet.

The invention further scans the hologram with a hologram reader and extracts the multiple quick response codes into individual quick response codes, reading information from each of the individual quick response codes and providing the read information.

These and further and other objects and features of the invention are apparent in the disclosure, which includes the above and ongoing written specification, with the claims and the drawings.

All three layers are separated cleanly.

Figure 2A:
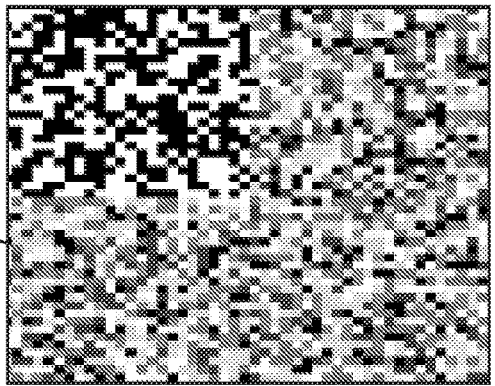
FIG. 2A shows a 48×48 3-layer QR code superimposing three layers of information.
Figure 2B:
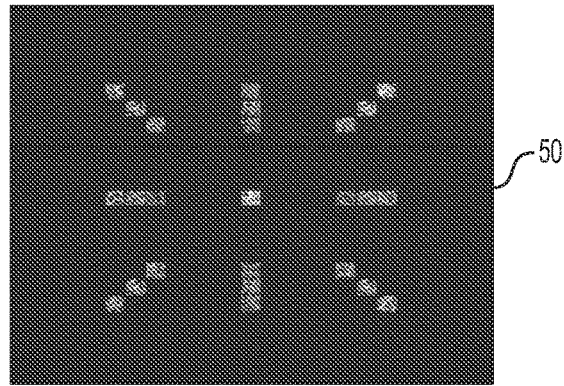
FIG. 2B shows an image of the e-layer QR code obtained with an imaging system using a dispersive hologram.
Figure 3:
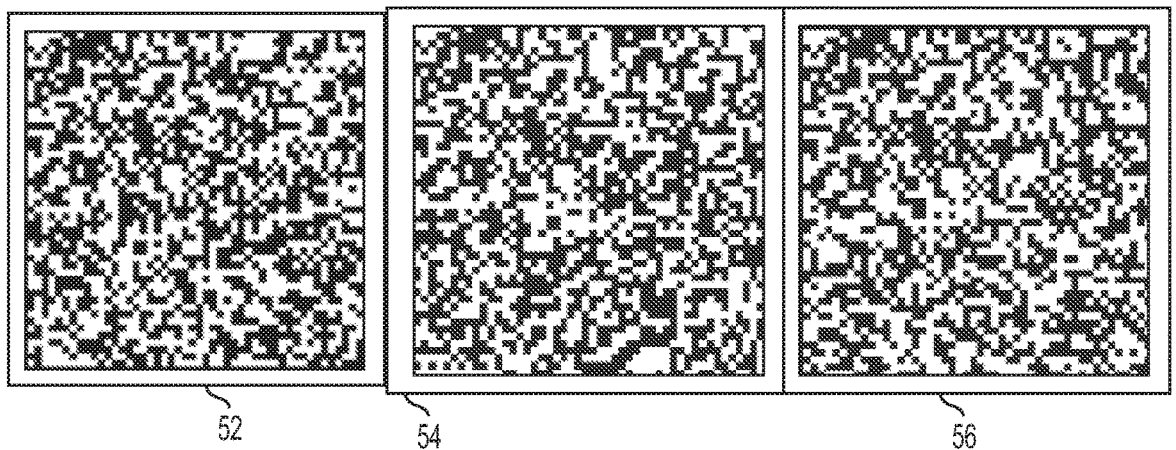

FIG. 3 shows recovered R, G, and B layers from the QR code in FIG. 2B.

FIG. 4A shows a B/W QR code.

FIG. 4B shows a label consisting of an image plane hologram.

FIG. 4C shows the label reconstructed with a reading device designed to read the hologram.

FIG. 5 shows a typical, readily tailorable to requirements, alphanumeric codebook.

FIGS. 6A and 6B are two examples of bit-coding of words from the table in FIG. 5. The bits can be arranged to form information stored in single layer B/W or colored QR codes.

FIG. 7 shows that CHQR is able to encode an enormous amount of information and features.

Figure 8:
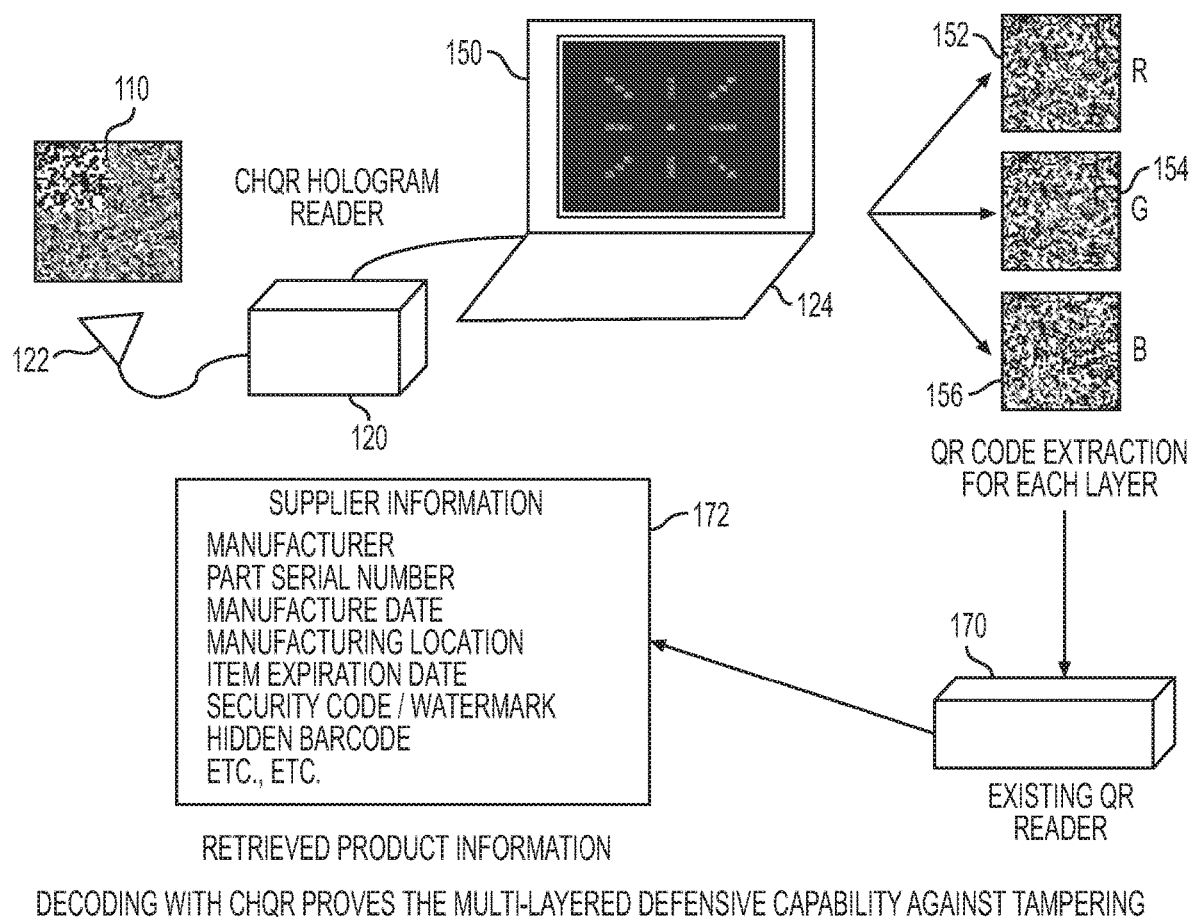

FIG. 8 shows decoding with CHQR and proves the multi-layered defensive capability against tampering.

DETAILED DESCRIPTION

Figure 1:
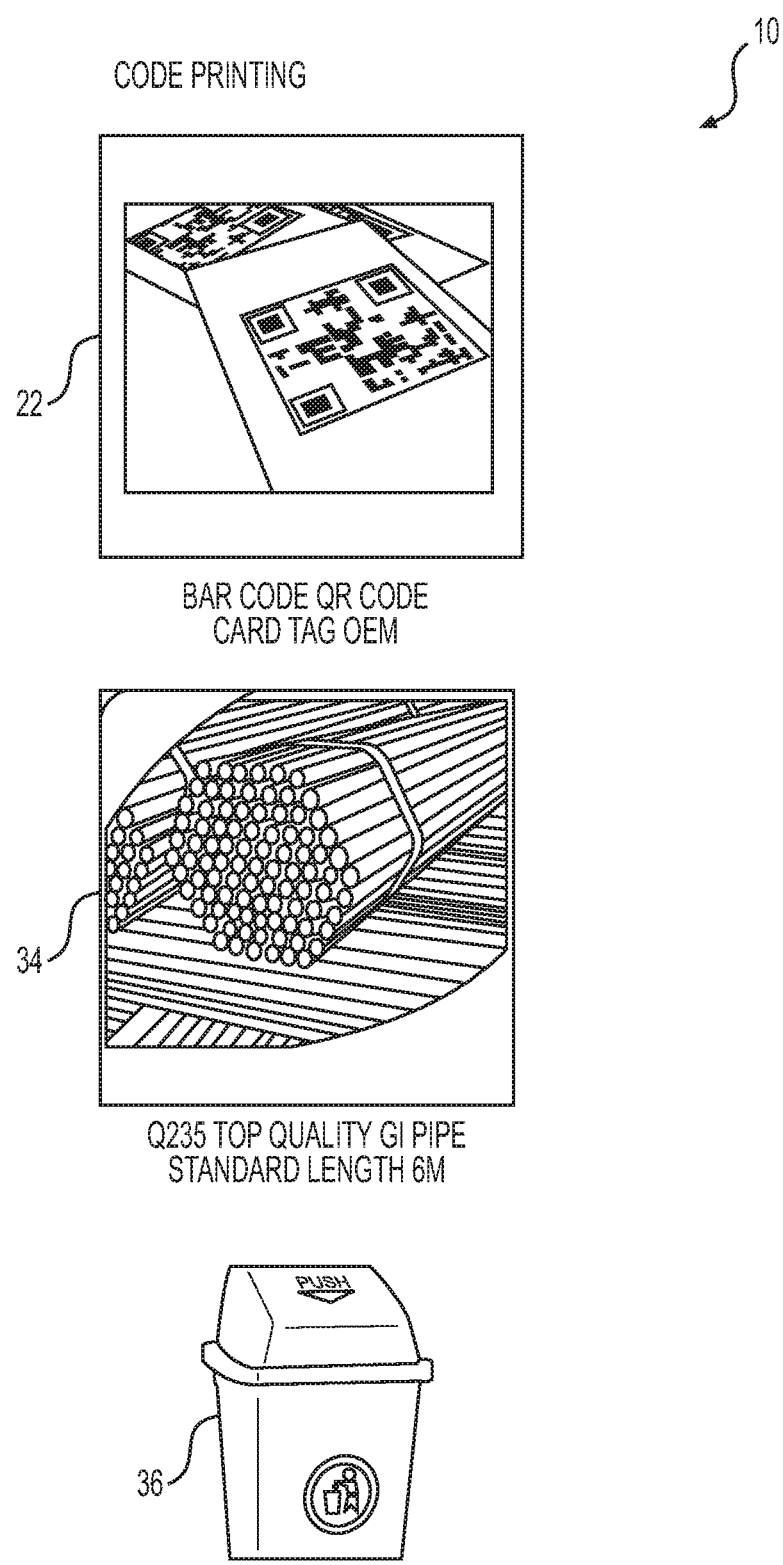
FIG. 1 shows examples 1 of QR codes with holograms which differ from color holographic QR codes.

FIG. 1 shows Examples of QR codes with Holograms which differ from Color Holographic QR codes.

The invention provides many new products 10, e.g. a custom manufacture hologram QR code 12, a custom made hologram QR code 14 and custom QR code 30 security hologram stickers 16.

The invention also provides custom hologram QR code tamper evident stickers 18 bar code and QR and hologram tags 22, and custom QR code and 3D security hologram stickers 24 with high security backings.

Also provided by the invention are QR coded holograms and hologram labels for passes 26, QR code tamper evident hologram stickers for high security 28, hot sale gold custom QR code 3D security hologram stickers 32, multiple QR code hologram labels for products such as galvanized iron pipes 34 and hologram identified containers 36.

To illustrate the new approach, a QR code is arbitrarily created, which could be as simple as a black and white (B/W) array of squares, or alternatively as sophisticated as a layer of three QR codes, in red, green and blue (RGB). The left side of FIG. 2 shows an example of a 48×48×3-layer deep QR code 40 with both B/W and RGB components. Each of the 3-layers potentially could have information. The superposed information is decomposed using an imaging system with a dispersive hologram or is read directly with an imaging sensor and holographic decoding software. The right side of FIG. 2 shows that the holographic system cleanly separates 50 the 3-layers of information. Here each label consists of a 2D array of red, green and blue layer squares 52, 54, 56 such as shown in FIG. 3. This is a composite of narrowband R, G and B bit planes. Each plane is 8-bit, with square values 0 (dark) or 255 (light). That is, each pixel has the value ($R_{ij}$, $G_{ij}$, $B_{ij}$) where each coordinate is either 0 or 255 or any range in between. Recovery of each layer of information is directly performed using an imager with a dispersive holographic optical element or read directly using holographic decoding software by which each R, G, B layer is read cleanly. Each layer is recovered completely as shown in FIG. 3.

Another alternate holographic system to use is image plane holography as illustrated in FIG. 4. The encoded QR bit array 72 in FIG. 4a is converted into a label using an image plane hologram 74 in FIG. 4b. To read the QR code's contents a device which could be an inexpensive molded diffractive type flat lens or added to a standard QR reader scans the label and recovers the input information 72 in FIG. 3c. Although this example uses a single layer of information, multilayer image plane holography is possible. Lenticular type holograms could also be used by which an image changes with the viewing angle.

FIG. 2 (Left) shows a 48×48 3-layer QR code 40 superimposing three layers of information which could be extended to 24 layers or any number of layers of information. FIG. 2 (Right) shows an image 50 of the 3-layer QR code obtained with an imaging system using a dispersive hologram; all three layers are separated cleanly.

FIG. 3 shows recovered R, G and B layers 52, 54, 56 from the QR code in FIG. 2b, which could be extended to any number of color layers using variable color index to represent each bit layer of information.

FIG. 4 (a) shows a B/W QR code 72. FIG. 4b shows a label consisting of an image plane hologram 74. FIG. 4c shows the label reconstructed 76 with a reading device designed to read the hologram.

A key point uses the mathematics of holography to encrypt a code that cannot be copied. The bit-pattern for each layer is developed using a codebook 80 as shown in FIG. 5. A character is coded as a sequence of six bits. In one coding scheme six b/w squares are in each layer. Such a codebook can be adapted for different applications or products; it is possible to develop codebooks and encoding schemes that make it harder to counterfeit and/or enable anti-tampering capabilities. FIG. 5 shows a typical, readily tailorable to requirements, alphanumeric codebook.

The character table in FIG. 5 codes a series of cells in each layer as illustrated in FIG. 6.

FIG. 6 shows two examples 90 of bit-coding of words from the table in FIG. 5. FIG. 6 shows bit coding for the labeling two species of fish found in Hawaii. The bits can be arranged to form information stored in single layer B/W or colored QR codes.

The Po'opa'a Ulua Kihikihi 92 is bit-coded 94. The Humuhumunukunukuapua'a 96 is bit-coded 98.

The principle behind the new FSCHQR is a multicolored (i.e. multilayered) QR, or other data encrypted label format, code enables an efficient way to encode an enormous amount of data about the product as well as other supplier information over wavelength ranges ranging from UV through IR. Each supplier inserts various pieces of information in each QR code layer, or other data bit-coding format that is not specific to the well-known QR format, with the option of spreading crucial information over a number of separate layers to make this system more tamper-resistant. Such information includes product information, date of manufacture etc. Standard one, and two, dimensional barcodes can also be hidden inside the multilayer code. Furthermore, digital watermarking capability can be added if desired. The general form of the FSCHQR can take the form of a picture consisting of a two-dimensional array of black and white or color pixels arranged in such a way as to appear as a recognizable image, scene, or product logo, however with an embedded and hidden label. A good design of a FSCHQR code enables a measure of digital intricacy analogous to the intricacy of the engraved designs of paper currency. An illustration for the encoding of information with FSCHQR is shown in FIG. 7.

FIG. 7 shows FSCHQR 100 is able to encode an enormous amount of information and features. Supplier Information 102 includes, for example, manufacturer, past serial number, manufacture date, manufacturing location, item expiration date, security code, water mark and other information. An existing coding device 104 produces QR codes in red, green and blue 106. Those three QR codes are combined in a Color Holographic Quick Response hologram 110.

FIG. 8 shows decoding with FSCHQR proves the multi-layered defensive capability against tampering. The overall process for decoding with FSCHQR is illustrated in FIG. 8. FSCHQR readers have the form factor of several millimeters on a side and can be implemented using a scanner, camera, or smart phone camera device in combination with holographic decoding software algorithm applications. In software, all the QR or generalized bit-data layers, and any hidden barcode(s) therein, can also be extracted separately for decoding by existing QR and barcode readers extending the data retrieval capability of barcode readers significantly, by a factor of 3, 6, 12, 24 or more depending on the number of layers used. In general, this can be extended for any wavelengths other than RGB. For example, readers for FSCHQR can use one or more dispersive holographic elements or use imaging sensors with extended sensitivity in the infrared. Each dispersive element is a computer-generated hologram (CGH) that operates at a given waveband. That is, one CGH disperser can be used for UV, another for visible, and another for IR etc. and generates images similar to FIG. 7.

In FIG. 8 the CHQR hologram 110 is scanned 122 and read in a CHQR hologram reader 120. A processor 124 using a dispersive hologram cleanly separates 150 all layers 152, 154, 156 of the QR codes and extracts QR codes for each layer. An existing QR reader 170 retrieves all product information 172.

Another embodiment of this invention is to increase the number of layers from 3 (RGB) to 32, 64 or more; these extensions will greatly enhance anti-tamper capability. Algorithms now being developed at HNu via internal IR&D enable this phenomenal anti-counterfeiting and anti-tampering capability. The FWCHQR label adds layer information within each color through bit-planes.

Another embodiment of the FSCHQR label is that it can also be "written to" and displayed as an active label on any compatible device, computer monitor, smartphone, or any handheld device, or any active of interactive display screen. The result is a powerful re-writable FWCHQR label where product data can be added to the label at each point of processing along a supply chain, creating a complete ledger of the history of a product from raw material to a finished delivered product.

For each R, G, or B layer (or additional layers) instead of a standard single color B/W QR code, the invention has a more continuous encoded data image spanning all color bit planes that can be extended to any region of the spectrum ranging from the ultraviolet, to the visible as well as the infrared and that can be embedded in a recognizable picture, graphic, logo or other promotional material, thereby changing the look of labels to be marketing labels.

In FSCHQR existing or novel digital watermarking or steganographic algorithms can be incorporated within different layers, without affecting the data being stored.

The FSCHQR introduces new art to the CHQR color holographic coded label where the FSCHQR label can be used as a full spectrum data storage device which can be encoded and decoded (read and written) with holographic software algorithms without requiring holographic optical elements for secure personal information storage such as but not limited to;

Personal Medical records

Bank and credit card records, including a security code and data block imprinted on credit cards or currency Travel records such as driver licenses, passport, itinerary, etc.

Purchasing Records, Recording Point of Sale Transactions.

Inventory and supply chain management systems with traceability

Complete ledger record of product from raw material to finished product

Personal security data block

Financial transaction record

Currency authentication

While the invention has been described with reference to specific embodiments, modifications and variations of the invention may be constructed without departing from the scope of the invention, which is defined in the following claims.

We claim:

1. Apparatus comprising a package label further comprising at one three multi-dimensional hologram, further comprising multi-dimensional quick response code creating the three multi-dimensional hologram, wherein the multi-dimensional quick response code further comprises multiple layers of quick response codes, wherein the multiple layers of quick response codes are three-layer quick response codes,
wherein the three layers of quick response codes are distinct color quick response codes,
wherein the color quick response codes are red, green and blue quick response codes.

2. The apparatus of claim 1, wherein the color quick response codes are full spectrum color quick response codes.

3. The apparatus of claim 1, the package label further comprising at least one three multi-dimensional hologram, further comprising multi-dimensional quick response code creating the hologram, wherein the multi-dimensional quick response code further comprises multiple layers of quick response codes, and, wherein the multiple layers of quick response codes further comprise matrices of quick response information coded as two-dimensional patterns in three or more color layers, each layer having a distinct color.

4. The apparatus of claim 3, wherein the three or more color layers are narrow band color layers.

5. The apparatus of claim 4, wherein the narrow band color layers include layers ranging from ultraviolet to infrared.

6. The apparatus of claim 3, wherein in the multiple layers of quick response information coded layers are converted into the hologram.

7. A method comprising:
providing a package label difficult to counterfeit, further comprising:
providing multiple quick response (QR) codes,
creating a multi-dimensional quick response code from the multiple quick response codes,
creating a coded three multi-dimensional hologram from the multi-dimensional quick response codes, and
applying the coded hologram to a package label,
wherein the providing the multiple quick response codes comprises providing multiple layer quick response codes, and wherein the providing multiple layer quick response codes comprises providing multiple layers of red, green and blue quick response codes.

8. The method of claim 7, wherein the providing multiple layer color quick response codes comprises providing full spectrum color quick response codes.

9. A method comprising:
coding labels with quick response codes, further comprising:
providing multiple quick response codes, each of the multiple quick response codes being in distinct frequency, in different light wave frequencies, and being printed in distinct colors
encoding numerous bits of information in each of the multiple quick response codes, and
combining the three dimensions the multiple quick response codes in three multi-dimensional two-dimensional hologram wherein the quick response codes are colored in red, green and blue.

10. The method of claim 9, wherein the distinct frequencies are distinct light frequencies between infrared and ultraviolet.

11. The method of claim 9, further comprising:
scanning the three multi-dimensional hologram with a hologram reader,
extracting the multiple quick response codes into individual quick response codes,
reading information from each of the response codes, and
providing the read information.

\* \* \* \* \*